Dec. 15, 1936.     J. F. TRITLE     2,064,637
CONTROL SYSTEM AND APPARATUS
Filed Aug. 30, 1935     2 Sheets-Sheet 1

Fig. 1.

Inventor:
John F. Tritle,
by Harry E. Dunham
His Attorney.

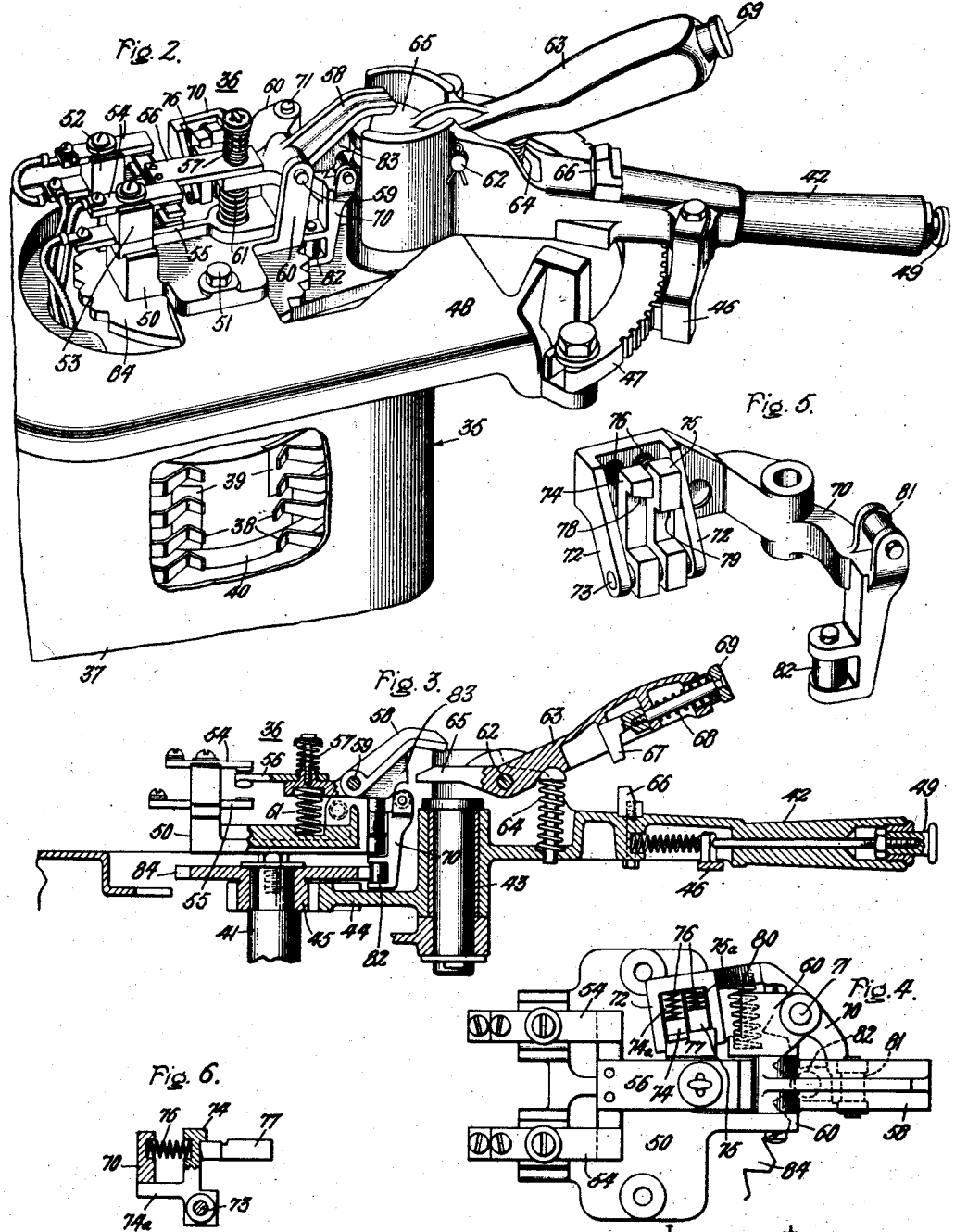

Patented Dec. 15, 1936

2,064,637

UNITED STATES PATENT OFFICE 2,064,637

CONTROL SYSTEM AND APPARATUS

John F. Tritle, Erie, Pa., assignor to General Electric Company, a corporation of New York Application August 30, 1935, Serial No. 38,573

10 Claims. (Cl. 172—179)

My invention relates to control systems for electric motors, more particularly to systems for controlling the acceleration of single-phase, alternating-current railway motors, and has for an object the provision of a simple, reliable and inexpensive control system of this character.

Heretofore it has been common practice to control the energization of single-phase, alternating-current motors by means of preventive coils and a plurality of tap contactors arranged to connect respective ends of the preventive coils in predetermined sequence to the transformer voltage taps so as to vary in predetermined steps the voltage supplied to the motors. While such systems are in most cases entirely satisfactory, it is sometimes desirable to vary the voltage through a relatively large number of small steps so as to provide a more gradual change of motor voltage and acceleration. Much is yet to be desired in control means for accomplishing such a gradual change of motor voltage without unduly increasing the number of tap contactors or other switching devices which must be employed, and accordingly, it is a further object of my invention to provide simple and reliable control means for producing a gradual change in motor voltage with a minimum number of switching devices.

In carrying out my invention in one form, I provide a control system which includes means for connecting suitable preventive coils to selected voltage taps of a supply transformer so as to vary in predetermined steps the energization of the preventive coils, an auxiliary transformer arranged with its secondary winding permanently connected in series circuit relation with the motor circuit and the preventive coils, and means for selectively energizing the auxiliary transformer in bucking or in boosting relation to the voltage derived from the preventive coils. More specifically, I provide a master controller operable by means of a main handle to a plurality of positions for controlling the energization of the preventive coils, and auxiliary switching means carried by the controller operable at any selected position of the main handle to control the energization of the auxiliary transformer. The auxiliary switching means is normally biased to a circuit controlling position providing for energization of the auxiliary transformer in bucking relation, and is operable to a plurality of other positions first to short-circuit the auxiliary transformer and then to provide for energization of the auxiliary transformer in boosting relation. Means are also provided for latching the switching means in either of the other circuit controlling positions upon operation thereto, and means are provided for automatically releasing the latching means upon operation of the main handle to its next notch or position so as to permit the switching means to return to the biased position, providing for bucking energization of the auxiliary transformer.

For a more complete understanding of my invention, reference may now be had to the drawings in which Fig. 1 is a somewhat diagrammatic illustration of a control system embodying my invention; Fig. 2 is a partial view in perspective of a preferred form of the master controller and auxiliary switching means shown somewhat diagrammatically in Fig. 1; Figs. 3 and 4 are respectively sectional elevational and plan views of the device shown in Fig. 2; Fig. 5 is a perspective view of the latching mechanism for the auxiliary switching means; and Fig. 6 is a detailed view illustrating the arrangement of one of the latching fingers shown in Fig. 5.

Referring now to the drawings, I have shown my invention in one form as applied to the control of a single-phase, alternating-current motor 10 provided with an exciting field winding 11, a compensating field winding 12 and an interpole field winding 13 arranged to be energized from a secondary winding 14 of a supply transformer 15, the primary winding 16 of which is connected by means of a pantograph 17 to a supply line 18, the other end of the primary winding being connected to ground, as indicated by the reference numeral 19. In order to vary in predetermined steps the voltage supplied to the motor, the secondary winding 14 is provided with a plurality of voltage taps connected directly to a plurality of tap switches or contactors 20 to 26 inclusive, the tap switches being connected to suitable preventive coils 27 and 28, a third preventive coil 29 having its respective ends connected to the mid-points of the preventive coils 27 and 28. It will be understood, of course, that each preventive coil is wound on an iron core to provide a relatively high reactance, the purpose of which is well understood by those skilled in the art.

Connected in series circuit relation with the motor 10, is an auxiliary transformer 30 for providing a bucking or boosting component of voltage so as selectively to decrease or increase the voltage supplied to the motor 10 by the supply transformer 15 and the preventive coils. As shown, the secondary winding 31 of the auxiliary transformer is permanently connected to the mid-point of the preventive coil 29 and to the exciting field winding 11 of the motor, and a pair of control switches 32 and 33 are provided for controlling the energization of the primary winding 34 of the auxiliary transformer.

In order to control the energization of the tap switches 20 to 26 inclusive and the control switches 32 and 33 in predetermined sequence, I provide a master controller 35 for controlling the tap switches, and auxiliary switching means 36 carried by the master controller for controlling the control switches 32 and 33. As shown best in Fig. 2, the master controller 35 is preferably of the drum controller type and comprises a casing 37 within which are provided a plurality of contact fingers 38 and a rotatable drum having suitable contact segments 39 and 40. The rotatable drum is preferably mounted on a shaft 41 (Fig. 3), the position of which is controlled by a main operating handle 42, the operating handle being pivoted, on a pin 43, as shown best in Fig. 3, and being provided with a segment gear 44 arranged to mesh with a pinion 45 carried by the shaft 41. Controllers of this general type are well known in the art and as shown, are ordinarily provided with notching mechanism comprising a spring-pressed pawl 46 normally arranged to engage a segment gear 47 secured to the cover 48 of the controller, a suitable push button 49 being arranged in the controller handle to operate the spring-pressed pawl 46 so as to provide for notching movement of the controller handle 42 and the shaft 41.

The auxiliary switching means 36 comprises a supporting base 50 secured to the cover 48 of the master controller in any suitable manner as by the screws 51. Mounted on the base 50, I provide a plurality of pairs of insulating blocks 52 and 53 for supporting spaced apart pairs of stationary contacts 54 and 55, and a cooperating movable contact member 56 is resiliently supported by means of a spring 57 on an operating member 58 which is pivoted intermediate its ends on a pin 59 supported by a pair of spaced lugs 60 extending outwardly from the base member 50. As shown, the operating member 58 is normally biased by means of a spring 61 to a position in which the movable contact member 56 engages the stationary contacts 54, and the end of the operating member 58 opposite from the movable contact member 56 projects over the pin 43 which forms the pivot for the main operating handle 42.

Pivotally mounted on a pin 62 carried by the main operating handle 42, is an auxiliary handle 63 which is normally biased to the position shown in Figs. 2 and 3 by a compression spring 64. As shown, the auxiliary handle 63 is provided with an extending finger 65 arranged to engage the projecting end of the operating member 58. Mounted on the main handle 42, is a stop member 66 arranged to cooperate with a positioning lug 67 slidably mounted on the auxiliary handle 63. A spring 68 normally biases the lug 67 to the position shown in Fig. 3, a push button 69 journaled in the auxiliary handle 63 being provided for operating the lug 67 against the bias of the spring 68 for a purpose to be more fully described hereinafter.

It will be apparent that when the auxiliary handle 63 is operated about its pivot 62 against the bias of the spring 64, the finger 65 will engage the extending end of the operating member 58 so as to operate the movable contact member 56 from the normal biased position shown in Fig. 1 against the bias of the spring 61. The contact member 56 moves first to an intermediate position in which neither of the pairs of contacts 54 or 55 is engaged, which position is shown in Figs. 2, 3, and 4, and then to a position in which the contacts 55 are engaged, and means are provided for latching the movable contact 56 in either of these positions upon operation thereto.

As shown best in Figs. 4 and 5, the latching means comprises an irregularly shaped supporting member 70 pivotally mounted intermediate its ends on a pin 71 extending from the base 50. Adjacent one end, the pivoted support 70 is provided with a pair of extending ears 72 for supporting a pin 73 on which suitable latch fingers 74 and 75 are pivotally mounted. The latch fingers 74 and 75 are biased by suitable springs 76 to the position shown in Figs. 5 and 6, in which position extending portions 74a and 75a of the respective latch fingers engage the pivoted support 70, only the one extending portion 74a being shown in Fig. 6.

Extending outwardly from the operating member 58, is a catch 77 arranged to be engaged by the latch fingers 74 and 75. When the movable contact 56 and the operating member 58 are in the normal biased position shown in Fig. 1, the springs 76 are compressed by engagement of the catch 77 with the respective faces of the latches 74 and 75 and upon operation of the contact 56 to its intermediate position, the catch 77 moves past a shoulder 78 on the latch finger 74, whereupon the latch finger 74 is moved by its biasing spring to the latching position shown in Figs. 4 and 6. Upon further movement of the contact 56 to its lowermost position, i. e. into engagement with the contacts 55, the catch 77 moves past a shoulder 79 on the latch finger 75, which finger is thereupon operated by its biasing spring to latch the contact 56 in its lowermost position.

As shown best in Fig. 4, the pivoted support 70 is biased for movement in a clockwise direction about its pivot 71 by a spring 80, and the position of the support 70 is controlled by a pair of rollers 81 and 82 carried thereby. As will be more fully described hereinafter, the roller 81 is arranged to cooperate with a cam 83 extending from the operating member 58, and the roller 82 cooperates with a star-wheel 84 preferably formed integrally with the pinion 45 on the shaft 41.

Having in mind the above description of the principal elements, it is believed that a complete understanding of my invention may be had from a description of the operation of the system as a whole. In Fig. 1, the master controller 35 is shown in its "off" position, and the auxiliary switching means 36 is shown in its normal biased position, in which position the movable contact member 56 engages the stationary contacts 54 so as to complete an energizing circuit for the control switch 32. In its energized position, the control switch 32 completes an energizing circuit for the primary winding 34 of the auxiliary transformer by connecting one terminal 34a of the primary winding to a voltage tap 85 on the secondary winding 14 of the supply transformer 15 by way of the conductors 86, 87 and 88, the other terminal 34b of the primary winding 34 being permanently connected to a voltage tap 89 on the secondary winding 14 by means of the conductors 90 and 91.

In order initially to energize the motor 10 with a relatively low voltage so as to provide a gradual acceleration of the motor, the main handle 42 of the controller is operated to its first position, in which position an energizing circuit is completed for the tap switch 20, which energizing circuit extends from the positive source of control energy 92 through the controller segments 93 and 94, the conductor 95, the interlock contacts on the tap switch 24 and by way of the operating winding of the tap switch 20 to a negative source of control energy 96. Upon closure of the tap switch 20, an energizing circuit is completed for the motor 10 which extends from the voltage tap 97 on the secondary winding 14 through the contacts of the tap switch 20, the conductors 98 and 99, the upper half of the preventive coil 27, the upper half of the preventive coil 29, the secondary winding 31 of the auxiliary transformer, the field and armature windings of the motor 10 and by way of the conductor 100 to the lowermost end of the secondary winding 14.

Since the auxiliary transformer 30 is energized by connection of its primary winding 34 to the voltage taps 85 and 89 and since the auxiliary transformer 30 is so wound that the voltage induced in the secondary winding 31 will be in bucking relation to the voltage supplied by the preventive coils, the voltage applied to the motor 10 will be equal to the voltage between the voltage tap 97 and the lowermost end of the secondary winding 14 minus the voltage drop in the upper halves of the preventive coils 27 and 29 and the voltage induced in the secondary winding 31 of the auxiliary transformer 30.

The voltage supplied to the motor 10 may now be increased by operating the auxiliary handle 63 from its first position, shown in Fig. 1, to its second position in which position the lug 67 engages the stop member 66, and the extending finger 65 engages the operating member 58 so as to move the contact member 56 to its intermediate position, in which position it will be retained by the latch finger 74 even though the auxiliary handle 63 is released. Upon operation of the contact member 56 to its intermediate position, the energizing circuit for the control switch 32 is interrupted and the consequent movement of the control switch 32 to its deenergized position interrupts the energizing circuit of the primary winding 34 and completes a circuit through the lower contact of the control switch 32, which circuit extends from the terminal 34a through the conductor 88, the lower contact of the control switch 32, the conductor 101, the lower contact of the control switch 33 and by conductor 102 to the connection point 103. Since this connection point 103 is connected to the voltage tap 89 by the conductor 90 and to the terminal 34b of the primary winding 34 by the conductor 91, it will be seen that both terminals of the primary winding 34 are connected to the same voltage tap and accordingly the transformer 30 is short-circuited. Consequently, the transformer 30 no longer bucks the voltage supplied through the preventive coil and the voltage applied to the motor 10 is, therefore, increased by an amount equal to the bucking voltage formerly supplied by the auxiliary transformer.

In order to increase further the voltage supplied to the motor, the push button 69 must be depressed to operate the lug 67 out of engaging relation with the stop member 66 whereupon the auxiliary handle 63 may be operated to its third position (see Fig. 1). As the auxiliary handle 63 is moved to this position, the finger 65 engages the operating member 58 and the movable contact member 56 is operated to its lowermost position, thereby closing an energizing circuit for the control switch 33 through the contacts 55. As hereinbefore mentioned, the latch finger 75 immediately operates to latch the contact 56 in its lowermost position.

Consequent to the establishment of this energizing circuit, the control switch 33 is operated to its energized or uppermost position to interrupt the short-circuit around the primary winding 34 and to connect the terminal 34a of the primary winding 34 to a voltage tap 104 by way of the conductor 88, the lower contact of the control switch 32, the conductor 101, the upper contact of the control switch 33 and the conductors 105 and 106. Since the voltage tap 89, to which the terminal 34b is permanently connected, is located intermediate the voltage taps 85 and 104, it will be apparent that the auxiliary transformer 30 is now energized in an opposite sense or in boosting relation to the voltage supplied by the preventive coils, and accordingly the voltage applied to the motor 10 will be increased by this boosting component of voltage.

It will be apparent that the voltage now applied to the motor 10 is a maximum for the first position of the master controller and in order to further increase the motor voltage it is necessary to increase the energization of the preventive coils and it is desirable at the same time to return the auxiliary switch means to the normal position providing for bucking energization of the auxiliary transformer. In accordance with my invention, this may be accomplished simply by moving the main operating handle 42 to its second notch or position.

As hereinbefore mentioned, the pivoted support 70 for the latching means is biased by the spring 80 for movement about its pivot in a clockwise direction, and as shown best in Fig. 4 the support 70 is normally retained in latching position by engagement of the roller 82 with one of the teeth on the star-wheel 84, which star-wheel is movable with the handle 42. Upon movement of the handle 42 from its first to its second position, the spring 80 forces the roller into the adjacent notch in the star-wheel and as the support 70 rotates about the pin 71 the latch fingers 74 and 75 are moved bodily out of engagement with the catch 77, the extending portions 74a and 75a limiting movement of the latching fingers by the spring 76, whereupon the contact 56 and the operating member 58 are returned to their normal biased position by the spring 61, and the control switches 32 and 33 are respectively energized and deenergized to connect the primary winding 34 of the auxiliary transformer 30 for energization in bucking relation.

Likewise, upon movement of the main handle 42 to its second position an energizing circuit is completed for the tap switch 21 through the segment 107 of the controller 35, and the energization of the preventive coils is thereby increased, the upper end of the preventive coil 28 being connected to a voltage tap 108.

The voltage now applied to the motor is equal to the voltage supplied to the preventive coils from the voltage taps 97 and 108, minus the voltage drops in the coils and the bucking component of voltage of the auxiliary transformer, and this voltage may be increased in small steps by sequentially operating the auxiliary switching means as heretofore described, first to short-circuit the auxiliary transformer 30 and then to energize the auxiliary transformer in boosting relation. Furthermore, it will be apparent that the voltage may thus be increased to its maximum value in small steps by operating the master controller to each of its respective notches or positions in sequence, and operating the auxiliary switching means through its previously described positions at each notch of the master controller, it being understood that the master controller is arranged to energize the tap switches 21 to 26 inclusive in sequence to connect the preventive coils to the next higher voltage tap at each position or notch of the controller. Since the arrangement of the controller segment and the tap switches for accomplishing this step by step increase in the energization of the preventive coils is well known in the art, the circuits established at each notch of the controller will not be explained in detail.

In some cases it may be desirable to accelerate the motor 10 quickly by increasing the voltage in relatively large steps, and this may be accomplished by simply operating the main handle of the controller through its sequential positions without recourse to the auxiliary switching means controlled by the auxiliary handle. In such cases it is desirable that the pivoted support 70 for the latching means shall not oscillate about its pivot as the star-wheel 84 rotates past the roller 82, and accordingly the cam 83 is arranged to engage the roller 81, so long as the operating member 58 is in its normal position, to restrain the support 70 against movement by the spring 80 independently of the position of the star-wheel 84. As soon as the operating member 58 is moved to either of its other positions, however, the cam 83 is disengaged from the roller 81 and the position of the support 70 is controlled solely by the star-wheel 84 and the roller 82 as hereinbefore described to provide automatic release of the latch means upon movement of the main handle.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention

What I claim as new and desire to secure by Letters Patent of the United States is:

1. A control system comprising a supply transformer having a plurality of voltage taps, preventive coils, means for sequentially connecting said preventive coils to said voltage taps to increase in predetermined steps the energization of said coils, a motor connected in series circuit relation with said transformer and said coils, an auxiliary transformer having a secondary winding permanently connected in said series circuit between said preventive coils and said motor, a primary winding for said auxiliary transformer, means for selectively connecting one terminal of said primary winding to one or the other of a pair of said voltage taps, means permanently connecting the other terminal of said primary winding to a voltage tap intermediate to said pair of taps, whereby said secondary winding is energized selectively to buck or boost the voltage supplied to said motor through said preventive coils, said connecting means also being operable to connect said one terminal of said primary winding to said intermediate tap to short-circuit said auxiliary transformer.

2. A control system comprising a supply transformer having a plurality of voltage taps, preventive coils, means for sequentially connecting said preventive coils to said voltage taps to increase in predetermined steps the energization of said coils, a motor connected in series circuit relation with said transformer and said coils, an auxiliary transformer having a secondary winding permanently connected in said series circuit between said preventive coils and said motor, a primary winding for said auxiliary transformer, means including a pair of contactors for controlling the energization of said primary winding, means for energizing said contactors selectively to connect one terminal of said primary winding to one or the other of a pair of voltage taps, means for permanently connecting the other terminal of said primary winding to a voltage tap intermediate to said pair of voltage taps, whereby said auxiliary transformer is energized selectively to buck or boost the voltage supplied to said motor through said preventive coils, and means for deenergizing both of said contactors to connect said one terminal to said intermediate tap, whereby said auxiliary transformer is short-circuited.

3. In a control system for an alternating current motor comprising means for varying in predetermined steps the voltage supplied to the motor and means for varying said voltage in predetermined smaller steps, the combination of a controller, a main handle for operating said controller selectively to a plurality of positions to control said first mentioned means, whereby said voltage is varied in predetermined steps, switch means for controlling said second mentioned means, an auxiliary handle carried by said main handle movable at any selected position of said main handle to operate said switch means from a normal position to a plurality of other positions whereby said voltage is varied in predetermined intermediate steps from the value provided by said first means, latch means for preventing said switch means from returning to said normal position upon release of said auxiliary handle, and means responsive to movement of said main handle to another position for releasing said latch means.

4. In a control system for an alternating current motor comprising means for varying in predetermined steps the voltage supplied to the motor and means for varying said voltage in predetermined smaller steps, the combination of a controller, a main handle for operating said controller selectively to a plurality of positions to control said first mentioned means, whereby said voltage is varied in predetermined steps, switch means for controlling said second mentioned voltage varying means, an auxiliary handle carried by said main handle normally biased to one position and movable to operate said switch means at any selected position of said main handle, means for biasing said switch means to a normal position, said switch means being operable by said auxiliary handle to a plurality of other positions to vary said voltage in predetermined intermediate steps from the value provided by said first mentioned means, latch means for retaining said switch means in either of said other positions upon release of said auxiliary handle, and means responsive to movement of said main handle to another position for releasing said latch means.

5. In a control system for an alternating current motor comprising a supply transformer having a plurality of voltage taps selectively connectible to preventive coils for varying in predetermined steps the voltage supplied to the motor, and an auxiliary transformer for supplying a bucking or boosting component of voltage to vary in predetermined smaller steps the voltage supplied to the motor, the combination of a controller, a main handle for operating said controller selectively to a plurality of positions to connect said preventive coils to selected voltage taps, switch means for controlling the energization of said auxiliary transformer, an auxiliary handle carried by said main handle movable at any selected position of said main handle to operate said switch means from a normal biased position to a plurality of other positions, said normal position of said switch means providing for energization of said auxiliary transformer in bucking relation, a second position of said switch means providing for short-circuiting said auxiliary transformer, and a third position of said switch means providing for energization of said auxiliary transformer in boosting relation, means for latching said switch means in either said second or said third position upon operation thereto, and means responsive to movement of said main handle to another selected position for releasing said latch means.

6. A controller comprising an operating handle notchable to a plurality of positions, auxiliary control contacts mounted adjacent said operating handle and biased to one circuit controlling position, means operable at any selected position of said operating handle for operating said auxiliary contacts to other circuit controlling positions, means for latching said contacts in any one of said other circuit controlling positions upon operation thereto, and means responsive to notching movement of said operating handle for releasing said latching means whereupon said auxiliary contacts return to said biased position.

7. A controller comprising an operating handle movable to a plurality of selected circuit controlling positions, auxiliary control contacts adjacent said operating handle normally biased to one position, an auxiliary handle pivoted on said operating handle, means operable by said auxiliary handle at any position of said operating handle for selectively operating said auxiliary contacts to other circuit controlling positions, means for latching said auxiliary contacts in any one of said other circuit controlling positions upon operation thereto, and means responsive to movement of said operating handle from one position to another for releasing said latching means whereupon said auxiliary contacts are returned to said biased position.

8. A controller comprising a plurality of cooperating contacts, an operating shaft, a main handle for operating said shaft to a plurality of selected positions to close and open said contacts in predetermined sequence, auxiliary control contacts mounted adjacent said main handle and biased to one circuit controlling position, an auxiliary handle pivotally mounted on said main handle and biased to a normal position, means operable in any position of said main handle for operating said auxiliary contacts to selected circuit controlling positions in response to movement of said auxiliary handle about its pivot, means for latching said auxiliary contacts in any one of said selected positions upon operation thereto, and means responsive to movement of said main handle to another position for releasing said latching means.

9. A control system comprising a supply transformer provided with a plurality of voltage taps, preventive coils, a controller operable to a plurality of positions for connecting said coils to selected voltage taps sequentially to vary the voltage of said coils in predetermined taps, a motor connected in series circuit relation with said coils and said transformer, an auxiliary transformer having a secondary winding connected in said series circuit between said coils and said motor, a primary winding for said auxiliary transformer, means for selectively connecting one terminal of said primary winding to one or the other of a pair of voltage taps, means permanently connecting the other terminal of said primary winding to a voltage tap intermediate said pair of taps whereby said auxiliary transformer is energized selectively to buck or boost the voltage supplied by said preventive coils, auxiliary contacts on said controller for controlling said selective connecting means, means including an auxiliary handle operable at each position of said controller for operating said auxiliary contacts from a normal position to a plurality of other circuit controlling positions, means for latching said auxiliary contacts in any selected position upon operation thereto, and means responsive to movement of said controller to another position for releasing said latch whereupon said auxiliary contacts return to said normal position.

10. A control system comprising a supply transformer provided with a plurality of voltage taps, a plurality of preventive coils, a plurality of tap switches for connecting said preventive coils to selected voltage taps, an alternating current motor connected in series circuit relation with said transformer and said preventive coils for energization therefrom, a controller operable to a plurality of positions for selectively energizing said tap switches to vary the voltage applied to said motor in predetermined steps, an auxiliary transformer provided with a secondary winding connected in circuit between said preventive coils and said motor, a plurality of contactors for controlling the energization of said auxiliary transformer, switch means carried by said controller for controlling said contactors, said switch means being normally biased to one position for controlling said contactors to energize said auxiliary transformer in bucking relation with the voltage supplied by said preventive coils, means for operating said switch means to a plurality of other positions at any selected position of said controller, said switch means in one of said other positions controlling said contactors to short-circuit said auxiliary transformer, said switch means in another of said positions controlling said contactors to energize said auxiliary transformer in boosting relation with the voltage supplied by said preventive coils, means for latching said switching means in either of said last two positions, and means for automatically releasing said latching means upon operation of said controller to another selected position.

JOHN F. TRITLE.